2,813,826
PREPARATION AND USE OF DRILLING FLUID TREATING AGENTS

Edgar I. Crowley, Pittsburgh, and Norman W. Franke, Penn Township, Allegheny County, Pa., assignors to Gulf Research & Development Company, Pittsburgh, Pa., a corporation of Delaware No Drawing. Application December 29, 1953, Serial No. 401,069

12 Claims. (Cl. 252—8.5)

This invention relates to drilling fluids such as are used in the drilling of wells with rotary drilling equipment. More especially, this invention pertains to the preparation of drilling fluid treating agents, and their incorporation and use in drilling fluids.

Broadly speaking, the researches conducted in connection with this invention have shown that products can be obtained by the oxidation of lignitic materials in aqueous alkaline media at elevated temperatures and at superatmospheric pressures that are valuable for treating drilling fluids, particularly with respect to modifying viscosity and gel strength and reducing fluid loss characteristics.

The preparation of drilling fluids according to this invention involves three main operations, namely, the treatment of lignitic materials by the oxidation thereof to produce useful derivatives, the separation or concentration of such useful derivatives, and the incorporation of such useful derivatives in a drilling fluid. Such main operations will be discussed in sequence.

Before proceeding with specific examples of the treatment of lignitic materials, the term "lignitic materials" is meant to define class IV coals as set forth in the ASTM Specification of Coals by Rank, D-388-38.

Production of the desired derivatives of lignitic materials is accomplished by the oxidation thereof in aqueous alkaline media at elevated temperatures and at superatmospheric pressures.

The aqueous alkaline media to which reference has been made can comprise any aqueous solution of any basic compound or compounds, preferably inorganic, that will not interfere with the desired reactions. Representative of such compounds can be mentioned basic inorganic compounds of either alkali metals or alkaline earth metals, the former being preferred, especially sodium compounds. Specific examples of such compounds which can be used include NaOH, KOH, $Na_2CO_3$, $Ba(OH)_2$, $Ca(OH)_2$, etc.

Compounds of the above-defined character are employed in aqueous solution in preferably more than about 5 percent concentration by weight. Such compounds should also be used in an amount of at least 5 percent by weight based on the amount of lignitic materials used, preferably in an amount in excess of 10 percent by weight in the case of relatively mild oxidation, and preferably in an amount in excess of 25 percent by weight in the case of relatively severe oxidation. The meaning of such relative degrees of oxidation will be subsequently clarified.

The treatment of the lignitic material comprises reacting the lignitic material with the aqueous alkaline media and an agent containing molecular oxygen at a temperature of about 125° C. to about 325° C., and preferably of about 150° C. to about 270° C. for a period of time. During the time that the mixture is held at an elevated temperature, the mixture is maintained under a pressure at least as great and preferably greater than that sufficient to maintain an aqueous liquid phase.

The time during which the reactants are maintained at the elevated temperature can be varied to an extent determined primarily by the temperature employed. Usually a time interval of about an hour is preferred; however, the employment of temperatures in the vicinity of the upper end of the stated temperature range will produce a significant yield of useful derivatives in as short a time as 5 minutes, while a longer time interval is preferred, even up to several hours, when temperatures in the vicinity of the lower end of the stated temperature range are employed.

The amount of molecular oxygen can be varied with the degree of oxidation desired. Relatively mild oxidation is obtained upon use of such an amount of molecular oxygen that the amount of oxygen consumed in the oxidation is in excess of about 10 and preferably in excess of about 30 to as much as about 80 percent by weight of the lignitic materials treated. Relatively severe oxidation is obtained upon using such amounts of molecular oxygen that the weight of the oxygen consumed in the oxidation exceeds about 80 and is less than about 250 percent by weight of the lignitic materials treated. Air is suitable for use as the agent containing molecular oxygen, and is preferred in view of economic considerations.

In general, it has been found that better yields of desired products have been obtained when the reactions have been allowed to proceed at the elevated temperature for a time sufficient that not more than about 50 percent solids by weight based on the lignitic material remains undissolved. In making such a determination, the solids are obtained by centrifuging for 10 minutes at 1800 R. P. M.

The total products or the total liquid products of the above-described reaction can, with or without some or all of the water removed therefrom, be directly incorporated in drilling fluids for improving the latter; however, it is preferred that the components therein that are particularly effective for treating drilling fluids be separated or concentrated as will presently be set forth.

Accordingly, after the lignitic materials have been treated as described above, the liquid reaction products are separated from the solids, preferably by centrifuging or filtration, to obtain a filtrate containing especially active components of the reaction products. Subsequent treatment of such filtrate will be described following two examples of the treatment of lignitic materials.

Example 1

80 grams of ground, dried, Texas lignite and 700 grams of 26 percent aqueous sodium hydroxide were sealed in a pressure vessel and placed in a rocking autoclave. The vessel and its contents were then heated to 200° C. and 40 grams of oxygen gas was introduced into the vessel. The temperature of 200° C. was maintained with rocking for a period of 85 minutes, after which the vessel was cooled and the gases released. The liquid contents of the vessel were then removed and centrifuged to remove solids to obtain a liquid product suitable for subsequent treatment.

Example 2

100 grams of dried, Texas lignite and 700 grams of 26 percent aqueous sodium hydroxide were placed in a sealed pressure vessel and the vessel and its contents then placed in a rocking furnace. The temperature of the vessel and its contents was then raised to 200° C. and oxygen gas was introduced while maintaining said temperature with rocking for 2 hours. The oxygen gas was introduced intermittently during the 2 hour reaction time to a total of 90 grams. At the end of the reaction time, the vessel was cooled and gases released. The liquid contents of the vessel were then removed and centrifuged to remove solids to obtain a liquid product suitable for subsequent treatment.

Proceeding now to the methods for separating or concentrating particularly effective constituents of the liquid products produced as described above, it has been found that such liquid products contain at least three separable, and generally distinguishable groups of lignitic derivatives that can be obtained therefrom that are valuable as treating agents for drilling fluids.

The procedure for obtaining such three groups of lignitic derivatives comprises taking the liquid product produced as previously described, and acidifying the same with a strong mineral acid. At least sufficient acid should be used to free substantially the organic acids present in the liquid from their metallic salts. In general, at least sufficient acid should be employed to neutralize substantially the basic compound originally used in treating the lignitic material, and it is preferred that at least sufficient acid be used that the resulting total free acidity (both organic and inorganic) be about one-half normal or greater. Among suitable acids that may be mentioned are hydrochloric acid, phosphoric acid, and sulfuric acid, with the latter being preferred.

Acidification of the liquid product as set forth above produces a precipitate that is a mixture containing complex, solid organic acids containing carboxyl and hydroxyl groups. Such precipitate is removed from the acidic liquor by any suitable separating procedure, such as centrifuging or filtration, and constitutes the first of the above-mentioned three groups of useful lignitic derivatives that can be obtained. It is believed that the character of the precipitate thus obtained can only be identified by the manner by which it is made.

The acidic liquor remaining after the precipitate is removed is then extracted with a low-boiling ether, preferably an ether boiling below about 200° C. of limited water solubility, and preferably an aliphatic ether containing 4 to 10 carbon atoms, with 4 to 6 carbon atoms being especially preferred. Among suitable ethers can be mentioned di-isopropyl ether, di-n-propyl ether, di-isobutyl ether, and di-n-amyl ether. The ether or extract layer is then removed and the ether evaporated therefrom to yield a solid acidic product that constitutes the second of the above-mentioned three groups of useful lignitic derivatives, which, like the first, is believed can be identified only by the manner by which the same is obtained.

The aqueous or raffinate layer remaining after the ether extraction is then extracted with an alcohol or ketone, preferably the latter, of limited water solubility and having a boiling point preferably below about 200° C. The alcohol or ketone used for such extraction should contain 4 to 10 carbon atoms, with aliphatic compounds, and particularly those containing 4 to 8 carbon atoms being preferred. Among suitable alcohols and ketones can be mentioned n-butyl alcohol, isobutyl alcohol, isooctyl alcohol, n-decyl alcohol, diethyl ketone, di-isopropyl ketone, di-isobutyl ketone, and di-n-amyl ketone. The extract layer, which can be directly incorporated in drilling fluid where deemed desirable or expedient is then removed and the solvent evaporated to yield a solid acidic product that constitutes the third of the above-mentioned three groups of useful lignitic derivatives, which also is believed to be identifiable only by the manner by which it is obtained.

In general, higher yields of the extracted products are obtained with greater oxidation of the lignitic materials.

Example 3 illustrates the isolation of the first of the three groups of useful lignitic derivatives contained in the liquid product obtained in Example 1.

Example 3

The liquid product obtained in Example 2 was mixed with 1000 gm. of 40 percent sulfuric acid, and the solid precipitate formed thereby was removed by filtering. The precipitate was then washed repeatedly with water, and thereafter dried and found to amount to 29.1 grams or 36.4 percent by weight of the amount of lignite used.

Example 4 illustrates the isolation of the three groups of useful lignitic derivatives contained in the liquid products obtained in Example 2.

Example 4

The liquid product obtained in Example 3 was mixed with 1000 gm. of 40 percent sulfuric acid, and the useful solid precipitate formed thereby was removed by filtration and found to amount to 41.0 grams after being washed with water and dried. The remaining filtrate or acidic liquor was then extracted with diethyl ether, the ether layer removed from the raffinate layer and the ether evaporated to have a useful solid acidic residue weighing 8.0 grams. The remaining aqueous or raffinate layer was then extracted with methyl ethyl ketone, after which the ketone layer was removed and the ketone evaporated therefrom to leave a further useful solid, acidic residue weighing 30.0 grams.

While in each of the Examples 3 and 4, the solid precipitate was washed with water, such procedure is not believed to be essential to render the precipitate suitable for incorporation in a drilling fluid, but was done for the purpose of removing water soluble inorganic salts (in this instance $Na_2SO_4$) from the preciiptate prior to weighing.

It should also be mentioned that the first extraction operation can be omitted, inasmuch as the second and final extraction operation will recover a useful mixture including substantially all of the lignitic derivatives that would otherwise be separately recovered by the two extraction operations. However, since the lignitic derivatives obtained by either the first or the second extraction operation, when both operations are performed, is superior for treating drilling fluids under certain circumstances to the mixture of lignitic derivatives obtained by the second extraction operation, when the first extraction operation is omitted; it is preferred that the first extraction operation not be omitted.

The lignitic derivatives obtained in Examples 3 and 4 have been incorporated in drilling fluids, and the properties of such drilling fluids are set forth in Tables I through IV.

Drilling fluid samples incorporating various concentrations of the solid precipitate obtained in Example 3 were made up from a drilling fluid comprising 300 grams of a Wyoming bentonite to 2700 ml. of tap water. In making up the samples, the solid precipitate obtained in Example 3, referred to in Tables I and II as "lignitic derivatives," was dissolved in aqueous sodium hydroxide and the solution incorporated in the drilling fluid. Tables I and II set forth in tabulated form the properties of such samples of drilling fluid. The data of Table II was obtained upon adjusting the pH of the samples to approximately a value of 9.0.

TABLE I

|  | Lignitic Derivatives, lb./bbl. | | | | | |
|---|---|---|---|---|---|---|
|  | 0 | 0.1 | 0.2 | 0.4 | 0.7 | 1.0 |
| Stormer Viscosity (cps.) | 70.8 | 52.0 | 51.5 | 49.0 | 46.9 | 45.2 |
| Initial Gel Strength (gms.) | 18.0 | 2.0 | 0 | 0 | 0 | 0 |
| 10 Minute Gel Strength (gms.) | 65.0 | 31.0 | 19.0 | 23.0 | 21.0 | 16.0 |
| pH | 9.0 | 9.13 | 8.96 | 8.71 | 8.60 | 8.50 |
| Fluid Loss (ml.) | 10.5 | 10.6 | 10.8 | 10.5 | 9.6 | 9.9 |
| Filter Cake Thickness (inches) | 3/32 | 4/32 | 3/32 | 3/32 | 3/32 | 3/32 |

TABLE II

|  | Lignitic Derivatives, lb./bbl. | | | | | |
|---|---|---|---|---|---|---|
|  | 0 | 0.1 | 0.2 | 0.4 | 0.7 | 1.0 |
| Stormer Viscosity (cps.) | 70.3 | 52.4 | 52.4 | 51.3 | 49.0 | 48.8 |
| Initial Gel Strength (gms.) | 9.0 | 0 | 0 | 0 | 0 | 0 |
| 10 Minute Gel Strength (gms.) | 51.0 | 24.0 | 21.0 | 23.0 | 19.0 | 12.0 |
| pH | 9.0 | 9.03 | 8.90 | 8.85 | 8.80 | 8.61 |
| Fluid Loss (ml.) | 10.2 | 10.0 | 9.9 | 9.6 | 9.5 | 9.5 |
| Filter Cake Thickness (inches) | 3/32 | 3/32 | 3/32 | 3/32 | 3/32 | 3/32 |

Drilling fluid samples incorporating various concentrations of the ether-extracted product of Example 4 and the methyl ethyl ketone-extracted product of Example 4 were made up from a 7 percent suspension of bentonite in tap water. The ether-extracted product was water soluble and was mixed directly into the drilling fluid, whereas the ketone-extracted product was first dissolved in aqueous sodium hydroxide and the solution mixed with the drilling fluid to facilitate incorporation in the drilling fluid. The pH of some of the ether-extracted product drilling fluid samples was adjusted to approximately 7, while the pH of the others was adjusted to approximately 10 prior to testing. Table III sets forth in tabulated form the properties of the various samples, while Table IV sets forth in tabulated form the properties of the various samples after aging 18 hours at 140° F.

TABLE III

| Lignitic Derivatives | Lignitic Derivatives lb./bbl. | Stormer Viscosity (cps.) | Initial Gel (gm.) | 10-Min. Gel (gm.) | pH | Fluid Loss (ml.) | Filter Cake Thickness (in.) |
|---|---|---|---|---|---|---|---|
| None | 0.0 | 20 | 14 | 27 | 7.8 | 24.8 | 5/64 |
| Methyl Ethyl Ketone Extract | 0.25 | 17 | 23 | 45 | 8.1 | 22.1 | 2/32 |
|  | 0.50 | 15 | 19 | 30 | 8.3 | 20.0 | 2/32 |
|  | 1.0 | 23 | 30 | 23 | 8.8 | 17.2 | 2/32 |
|  | 2.0 | 29 | 44 | 88 | 8.9 | 13.8 | 1/32 |
| Ether Extract (pH approx. 7) | 0.25 | 8 | 4 | 10 | 7.4 | 26.2 | 5/64 |
|  | 0.50 | 9 | 6 | 11 | 7.2 | 27.3 | 5/64 |
|  | 1.0 | 7 | 2 | 10 | 7.1 | 30.0 | 5/64 |
|  | 2.0 | 8 | 6 | 11 | 6.9 | 32.4 | 5/64 |
| Ether Extract (pH approx. 10) | 1.0 | 31 | 51 | 90 | 10.0 | 15.5 | 2/32 |
|  | 2.0 | 26.5 | 53 | 102 | 10.5 | 12.8 | 1/32 |

TABLE IV

| Lignitic Derivatives | Lignitic Derivatives lb./bbl. | Stormer Viscosity (cps.) | Initial Gel (gm.) | 10-Min. Gel (gm.) | pH | Fluid Loss (ml.) | Filter Cake Thickness (in.) |
|---|---|---|---|---|---|---|---|
| None | 0.0 | 25 | 32 | 52 | 7.6 | 24.5 | 3/32 |
| Methyl Ethyl Ketone Extract | 0.25 | 22 | 18 | 36 | 7.6 | 21.4 | 2/32 |
|  | 0.50 | 19 | 22 | 40 | 7.6 | 18.5 | 2/32 |
|  | 1.0 | 32 | 35 | 68 | 6.8 | 15.5 | 2/32 |
|  | 2.0 | 40 | 50 | 87 | 8.0 | 12.2 | 1/32 |
| Ether Extract (pH initially approx. 7) | 0.25 | 12 | 6 | 15 | 7.4 | 27.4 | 5/64 |
|  | 0.50 | 13 | 4 | 8 | 7.2 | 29.8 | 5/64 |
|  | 1.0 | 9 | 4 | 7 | 6.9 | 30.4 | 5/64 |
|  | 2.0 | 9 | 2 | 5 | 6.6 | 32.3 | 5/64 |
| Ether Extract (pH initially approx. 10) | 1.0 | 39 | 37 | 65 | 8.5 | 13.2 | 1/32 |
|  | 2.0 | 50 | 52 | 112 | 8.9 | 11.8 | 1/32 |

In all the preceding tables, as well as in the appended claims, the concentrations set forth as pounds per barrel refer to a 42 gallon barrel.

The three groups of lignitic derivatives produced and separated according to the procedure outlined above are very effective treating agents as may be seen upon inspection of the tables presented above, and can be economically produced from abundant domestic sources of the required raw materials. In general, it has been found that the three groups of lignitic derivatives produce results that are in some respects somewhat analogous and quite comparable to those obtained upon using quebracho, an imported conventional treating agent, as a treating agent. In fact, it is believed that the ether-extracted lignitic derivatives are definitely superior to quebracho for treating relatively low pH drilling fluids for thinning purposes. It is to be noted that while the ketone-extract product and high pH ether-extract product drilling fluids have increased viscosity and gel strengths, such drilling fluids have substantially reduced fluid loss characteristics.

While the use of each of the three groups of lignitic derivatives has been described in conjunction with water base drilling fluids, it is believed that they can also be used with beneficial results in what are known in the art as oil-in-water emulsion drilling fluids. In addition, drilling fluids incorporating the described lignitic derivatives can be also treated with conventional treating agents, such as weighting agents, starch, CMC, etc.

If desired, or deemed expedient, two or more of the three described lignitic derivatives can be incorporated in a drilling fluid, rather than being used singly. While the total amount of lignitic derivatives used in a drilling fluid can vary over rather wide limits, say between 1/10 to 20 pounds per barrel, with economics and the degree of beneficial results desired being the prime considerations; it is generally preferred that the total amount of lignitic derivatives employed be about 1/4 to about 5 pounds per barrel of drilling fluid.

Although the solid acids produced in Example 3 and the ketone-extracted product obtained in Example 4 were described as being first dissolved in a suitable solvent that will not destroy the treating properties thereof before being incorporated in the drilling fluid samples, it is believed that such dissolving operation can, at least in many instances, be omitted particularly when incorporating the ketone-extracted product in a drilling fluid. Direct incorporation of the lignitic derivatives in conventional drilling fluids it is believed will be facilitated by the fact that most drilling fluids have pH values on the basic side, inasmuch as the lignitic derivatives are soluble in aqueous alkaline solutions.

It should be mentioned that the step of removing solids can be omitted prior to acidification, however, such omission will result in dilution of the first of the three groups of derivatives, and necessitate the use of large quantities thereof for treating purposes.

The invention has been described in considerable detail in order to convey a full understanding thereof, and no inference of limited scope of invention should be drawn therefrom; attention being directed to the appended claims for ascertainment of the scope of the invention.

We claim:

1. The process of preparing drilling fluid treating agents comprising reacting a lignitic material with molecular oxygen and an aqueous alkaline solution at an elevated temperature and superatmospheric pressure, removing solids from the liquid products of such reaction, acidifying said liquid products of such reaction to precipitate solid acids, removing the precipitated solid acids from the resulting solution as the first treating agent, extracting said resulting solution with an ether containing 4 to 10 carbon atoms, then extracting the resulting raffinate with a solvent selected from the group consisting of alcohols and ketones having 4 to 10 carbon atoms, and separately recovering the substances extracted by the ether and the solvent as second and third treating agents respectively.

2. The process of preparing drilling fluid treating agents comprising reacting a lignitic material with molecular oxygen and an aqueous alkaline solution at an elevated temperature and superatmospheric pressure, acidifying the total products of such reaction to precipitate solid acids, removing solids from the resulting solution as the first treating agent, extracting said resulting solution with an ether containing 4 to 10 carbon atoms, then extracting the resulting raffinate with a solvent selected from the group consisting of alcohols and ketones having 4 to 10 carbon atoms, and separately recovering the substances extracted by the solvent as second and third treating agents respectively.

3. A low pH drilling fluid having incorporated therein a thinning amount of the second treating agent prepared according to claim 1.

4. A process in accordance with claim 2 in which said ether is an aliphatic ether.

5. A process in accordance with claim 2 in which said solvent is an aliphatic alcohol containing 4 to 8 carbon atoms.

6. A process in accordance with claim 2 in which said solvent is an aliphatic ketone containing 4 to 8 carbon atoms.

7. A drilling fluid having incorporated therein an amount of the second treating agent prepared according to claim 2 sufficient to reduce the fluid loss and filter-cake building characteristics thereof.

8. A low pH drilling fluid having incorporated therein a thinning amount of the second treating agent prepared according to claim 2.

9. The process of well-drilling comprising drilling while circulating in the borehole the drilling fluid of claim 3.

10. The combination of claim 3, wherein said second treating agent is incorporated in an amount of about ¼ to about 5 pounds per barrel of drilling fluid.

11. A process in accordance with claim 4 in which said aliphatic ether contains 4 to 6 carbon atoms.

12. The process of well-drilling comprising drilling while circulating in the borehole the drilling fluid of claim 7.

References Cited in the file of this patent
UNITED STATES PATENTS 2,545,169    Salathiel _____ Mar. 13, 1951

OTHER REFERENCES

"Organic Acids by Direct Oxidation of Coal," Chemical Industries, April 1946, pages 580 and 581.